United States Patent
Hillsberg et al.

(10) Patent No.: US 11,422,950 B2
(45) Date of Patent: Aug. 23, 2022

(54) COMPUTING AND COMMUNICATION MODULE

(71) Applicant: Thinklogical LLC, Milford, CT (US)

(72) Inventors: Mitchell C. Hillsberg, Burlington, CT (US); Michael G. Engler, Stamford, CT (US); David Litke, Warren, CT (US)

(73) Assignee: THINKLOGICAL, LLC, Milford, CT (US)

( * ) Notice: Subject to any disclaimer, the term of this patent is extended or adjusted under 35 U.S.C. 154(b) by 60 days.

(21) Appl. No.: 16/508,528

(22) Filed: Jul. 11, 2019

(65) Prior Publication Data

US 2020/0019518 A1    Jan. 16, 2020

Related U.S. Application Data

(60) Provisional application No. 62/697,105, filed on Jul. 12, 2018.

(51) Int. Cl.
*G06F 13/10* (2006.01)
*G06F 9/455* (2018.01)

(52) U.S. Cl.
CPC ........ *G06F 13/102* (2013.01); *G06F 9/45558* (2013.01)

(58) Field of Classification Search
CPC .............................. G06F 13/102; G06F 9/45558
See application file for complete search history.

(56) References Cited

U.S. PATENT DOCUMENTS

| | | | |
|---|---|---|---|
| 6,175,565 B1 * | 1/2001 | McKinnon | H04L 12/5692 370/217 |
| 2004/0215617 A1 | 10/2004 | Ramsey | |
| 2007/0239900 A1 * | 10/2007 | Beasley | G06F 13/4282 710/2 |
| 2012/0075795 A1 * | 3/2012 | Petruzzo | G06F 1/20 361/679.48 |
| 2015/0181746 A1 * | 6/2015 | Mullen | H05K 7/20709 361/679.31 |
| 2015/0254199 A1 * | 9/2015 | Sullivan | G06F 13/385 710/12 |
| 2018/0242442 A1 * | 8/2018 | Luskind | G06F 1/182 |
| 2019/0018700 A1 * | 1/2019 | Antony | G06F 9/45558 |

FOREIGN PATENT DOCUMENTS

CN          106612316 A    5/2017

OTHER PUBLICATIONS

Notification of Transmittal of the International Search Report for International Application No. PCT/US2019/041512 which is Related to U.S. Appl. No. 16/508,528; Report dated Oct. 11, 2019; Report dated Oct. 23, 2019; 17 pages.
Written Opinion of the International Searching Authorithy for International Application No. PCT/US2019/041512 which is Related to U.S. Appl. No. 16/508,528; Report dated Oct. 11, 2019; Report dated Oct. 23, 2019; 8 pages.

* cited by examiner

*Primary Examiner* — Henry Tsai
*Assistant Examiner* — John B Roche
(74) *Attorney, Agent, or Firm* — Cantor Colburn LLP (57) ABSTRACT

A computing and communication module, includes: a processing circuit; and a keyboard, video and mouse, KVM, extender transmitter disposed in signal communication with the processing circuit; wherein four equally sized ones of the module are collectively sized to fit within a volume of space defined by 1 racking unit, 1RU.

20 Claims, 11 Drawing Sheets

COMPUTING AND COMMUNICATION MODULE

CROSS REFERENCE TO RELATED APPLICATIONS

This application claims the benefit of U.S. Provisional Application Ser. No. 62/697,105, filed Jul. 12, 2018, which is incorporated herein by reference in its entirety.

BACKGROUND OF THE INVENTION

The present disclosure relates generally to a computing and communication module, and particularly to an all-in-one module that is a full-featured virtual processor in a VDI (virtual desktop infrastructure) architecture combined and integrated with a high-performance KVM (keyboard, video, and mouse) transmitter extender.

Virtual desktop technology enables the access of PC applications and data content, which are executing and stored on central servers located in data centers. This remote connectivity to the central servers is achieved with thin clients (an operating system executing with non-volatile memory for data retention after power cycling) or zero clients (an operating system executing with none or limited data retention after power cycling) which are executing client virtualization software provided by software suppliers that are known in the art. Although both cost and security benefits are provided with such virtual desktop technologies, requiring the IP (interne protocol) network to be accessible at the user's desk is a significant security vulnerability. To protect the data content located on the central servers, information assurance directives require the removal of the physical network access to the users' desks.

While existing virtual desktop technologies may be suitable for their intended purpose, the art relating to virtual desktop technology would be advanced with a computing and communication module that eliminates the system security vulnerability of existing virtual desktop technologies by enabling the VDI client to be physically secured in the data center along with the KVM transmitter extender and the central server, removing the network from an end-user's desk.

BRIEF DESCRIPTION OF THE INVENTION

An embodiment includes a computing and communication module having: a processing circuit; and a keyboard, video and mouse, KVM, extender transmitter disposed in signal communication with the processing circuit; wherein four equally sized ones of the module are collectively sized to fit within a volume of space defined by 1 racking unit, 1RU.

An embodiment includes a chassis compartment having: a plurality of side-by-side ones of the aforementioned computing and communication module; at least one power supply configured or adapted to provide electrical power to the plurality of modules; at least one first fan configured or adapted to deliver air movement toward the at least one power supply; at least on second fan configured or adapted to deliver air movement toward the plurality of modules; the plurality of modules being disposed in a sequential side-by-side arrangement from a nearest location to a farthest location relative to the at least one second fan; a temperature sensing and fan control system configured or adapted to: select an operational one of the plurality of modules that is at the farthest location as a master module, and in response to the master module becoming non-operational, automatically select another operational one of the plurality of modules that is at the next farthest location as a replacement master module; wherein the module selected as the master module, or as the replacement master module if the master module is non-operational, is the controlling module that controls send and receive data to and from the temperature sensing and fan control system for controlling operation of the at least one second fan based at least in part on a sensed temperature associated with the controlling module.

An embodiment includes a method of computing and communicating via at least one electronic module that is the aforementioned computing and communication module, the method including: receiving parallel input data from a virtual desktop infrastructure, VDI, client; converting the parallel data into serial data for transmission via a keyboard, video and mouse, KVM, extender transmitter; and transmitting the serial data downstream of the at least one electronic module; wherein the VDI client and the KVM extender transmitter are integrally arranged to form one of the at least one electronic module absent discrete electrical or optical end-user cabling disposed therebetween.

The above features and advantages and other features and advantages of the invention are readily apparent from the following detailed description of the invention when taken in connection with the accompanying drawings.

BRIEF DESCRIPTION OF THE DRAWINGS

Referring to the exemplary non-limiting drawings wherein like elements are numbered alike in the accompanying Figures.

DETAILED DESCRIPTION OF THE INVENTION

Although the following detailed description contains many specifics for the purposes of illustration, anyone of ordinary skill in the art will appreciate that many variations and alterations to the following details are within the scope of the claims. Accordingly, the following example embodiments are set forth without any loss of generality to, and without imposing limitations upon, the claimed invention.

An embodiment, as shown and described by the various figures and accompanying text, provides an integrated, all-in-one, computing and communication module that eliminates the system security vulnerability of existing virtual desktop technologies by enabling a VDI client to be physically secured in a data center along with a KVM extender transmitter and the central server, thereby removing the network from an end-user's desk. In addition to solving the matter of security, the integrated module provides: increased graphic performance, space savings, enhanced reliability, and enhanced maintainability. In an embodiment, the integrated module includes a VDI client and a KVM extender transmitter, where four equally sized ones of the integrated module are collectively sized to fit within a volume of space defined by one racking unit, 1RU, which is a height measure known in the art of rack-mounted components, such as server components or network switches, to be 1.75 inches, where the 1RU has a width of 19 or 23 inches and a depth of 19 or 23 inches. In an embodiment as disclosed herein, 1RU is defined as a volume of space having a height H equal to 1.75 inches, a width W equal to or greater than 19 inches, and a depth D equal to or greater than 19 inches.

Figure 1:
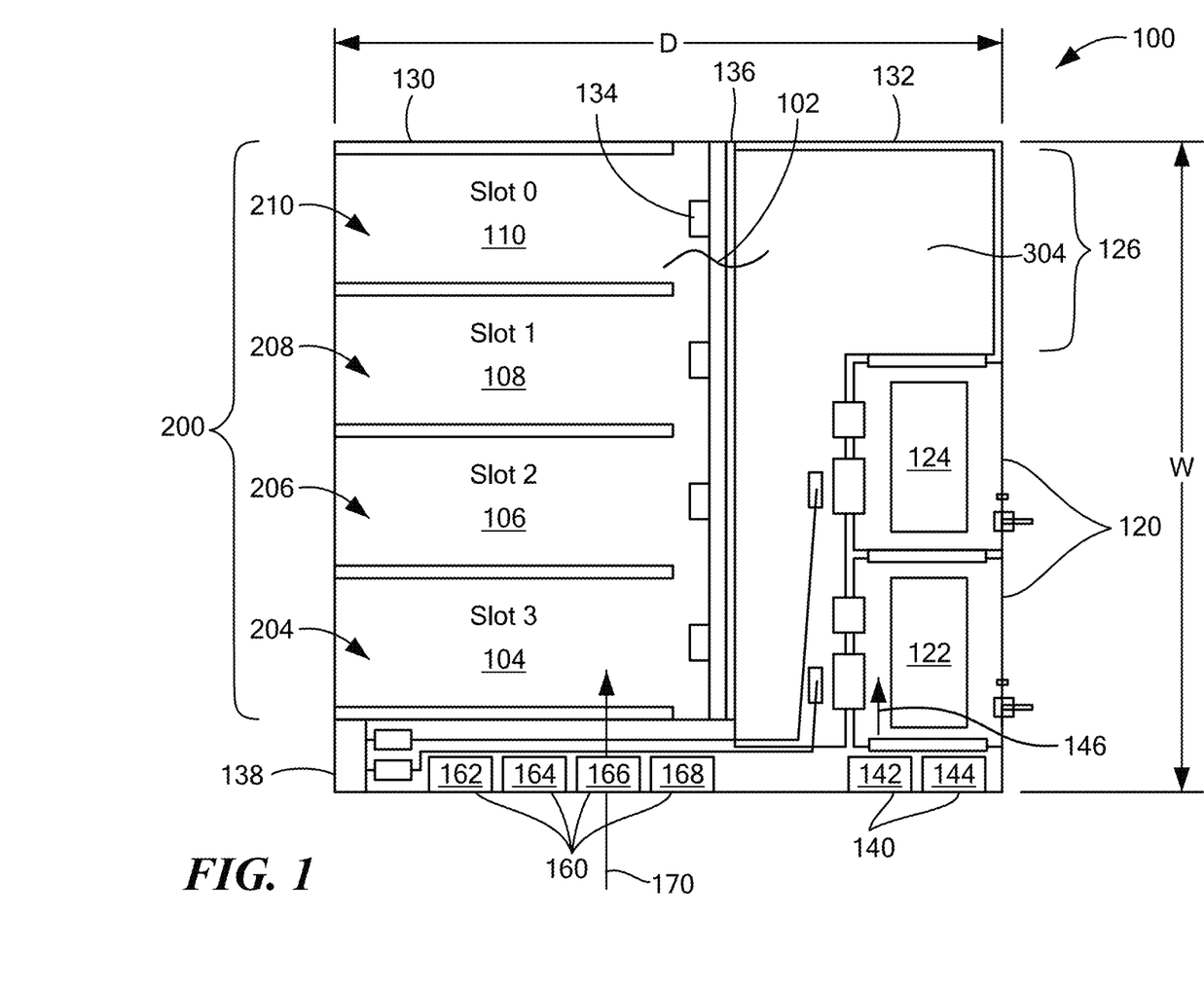
FIG. 1 depicts a one racking unit, 1RU, chassis, in accordance with an embodiment.

FIG. 1 depicts a high power quad 1RU chassis 100 having a midplane PC board 304 with a rear section 130 connected to a front section 132 via midplane PC board slot connectors 134 and separated via a baffle 136. The chassis 100 has an interior compartment 102 having a plurality of side-by-side slots 104, 106, 108, 110 (labeled; Slot 3, Slot 2, Slot 1, and Slot 0, respectively), each slot sized to receive a corresponding one of a plurality of side-by side modules 204, 206, 208, 210 (collectively herein referred to by reference numeral 200 and described further herein below), where each module includes the aforementioned VDI client and KVM extender transmitter. The chassis is further sized to receive at least one power supply 120 configured or adapted to provide electrical power to the plurality of modules 200, at least one first fan 140 configured or adapted to deliver air movement 146 toward the at least one power supply 120, and at least on second fan 160 configured or adapted to deliver air movement 170 toward the plurality of modules 200. In an embodiment, the plurality of modules 200 are disposed in a sequential side-by-side arrangement (204, 206, 208, 210 for example) from a nearest location 204 to a farthest location 210 relative to the at least one second fan 160. The chassis interior compartment 102 further includes a temperature sensing and fan control system 300 configured or adapted to; select an operational one of the plurality of modules 200 that is at the farthest location, 210 for example, as a master module, and in response to the master module becoming non-operational, automatically select another operational one of the plurality of modules that is at the next farthest location, 208 for example, as a replacement master module, wherein the module selected as the master module, or as the replacement master module if the master module is non-operational, is the controlling module that controls send and receive data to and from the temperature sensing and fan control system 300 for controlling operation of the at least one second fan 160 based at least in part on a sensed temperature associated with the controlling module, 210 or 208 or another one of the plurality of modules 200 for example. Further details of the temperature sensing and fan control system 300 is provided herein below. In an embodiment, the at least one power supply 120 includes two power supplies 122, 124, the at least one first fan 140 includes two fans 142, 144, and the at least one second fan 160 includes four fans 162, 164, 166, 168. AC power supply input connectors 138 provide power connection ports for the various power demanding components on the midplane PC board 304, which includes a region 126 for status LEDs and alarm contacts (not specifically shown). In an embodiment, the chassis interior compartment 102, and more specifically the chassis 100 itself, is sized to fit within a volume of space defined by 1RU, as defined herein above.

Figure 2:
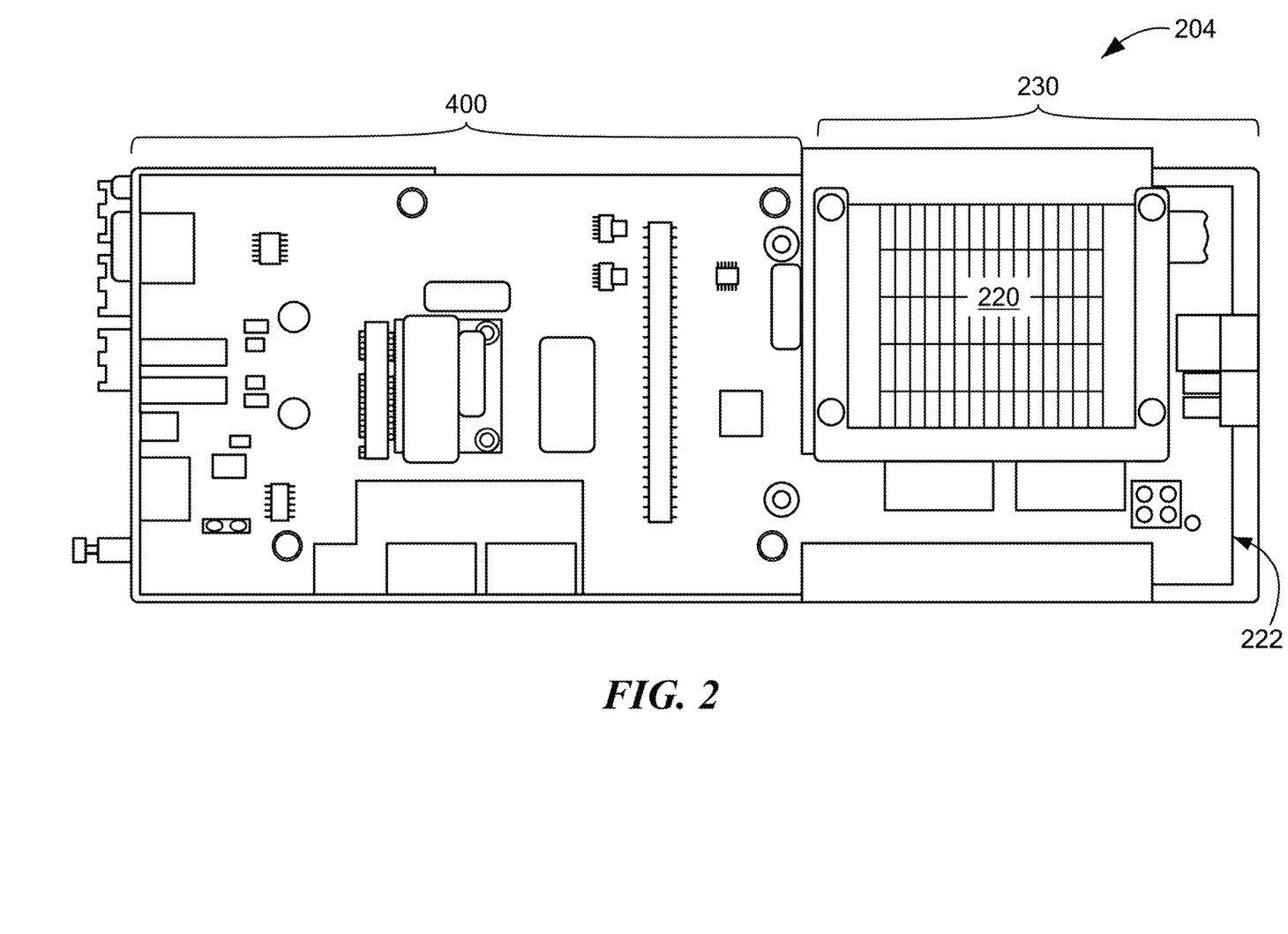
FIG. 2 depicts a single module of an integrated VDI client and KVM transmitter extender, in accordance with an embodiment.
Figure 3:
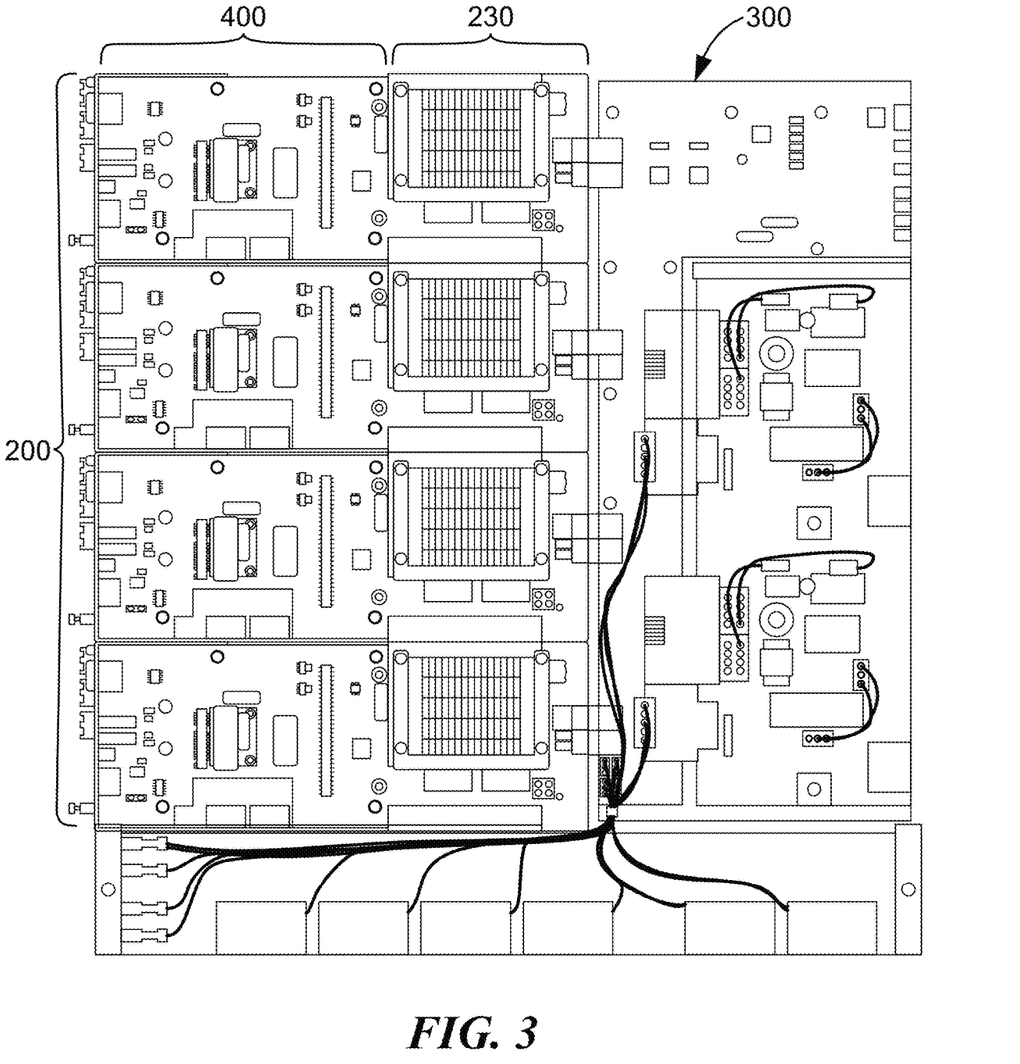
FIG. 3 depicts four equally sized ones of the module of FIG. 2 arranged side-by-side in the 1RU chassis of FIG. 1, in accordance with an embodiment.

Reference is now made to FIGS. 2 and 3, where FIG. 2 depicts a single module, 204 for example (reference numeral 204 arbitrarily selected from reference numerals 204, 206, 208, 210 to refer to an example single module), of the plurality of modules 200, and FIG. 3 depicts four equally sized modules of the plurality of modules 200 that are collectively sized to fit within a volume of space defined by 1RU, as defined herein above. In an embodiment, each module of the plurality of modules 200 includes a processing circuit 220 with supporting circuitry 222 (disposed on a printed circuit board for example) that is in combination configured or adapted to function as a VDI client 230 (the operation of which being in a manner known in the art), and a keyboard, video and mouse, KVM, extender transmitter 400 disposed in signal communication with the VDI client 230, and thereby with the processing circuit 220. In an embodiment, the VDI client 230 and the KVM extender transmitter 400 are integrally arranged within the module 204 absent discrete electrical or optical end-user cabling disposed therebetween, and absent discrete electrical or optical end-user plug-in connectors disposed therebetween, thereby removing vulnerability of undesirable network access. As used herein, the term "end-user" cabling or plug-in connectors, refers to features or items that are specifically and purposefully designed, manufactured, and marketed, as usable by an end user for repeatable attachment and detachment of an interconnected VDI client and KVM extender transmitter. That said, the absence of such "end-user" plug-in connectors does not preclude the use of plug-in connectors that are specifically and purposefully designed, manufactured, and marketed, as single or limited use connectors for the purpose of fabricating the module 204 as an integral arrangement of the VDI client 230 and the KVM extender transmitter 400, where separation of the two is not intended, or is intended only for system upgrades or maintenance. Advantages of avoiding the use of end-user cabling and/or plug-in connectors include: providing a compact integrated combination of a VDI client and KVM extender transmitter; increasing module density; providing improved reliability; and, improving system security by minimizing a level of physical access to components connected to the network that would otherwise be available. In an embodiment, each module 204, 206, 208, 210 of the plurality of modules 200 is hot-swappable in and out of the chassis compartment 102, or more specifically hot-swappable in and out of the corresponding side-by-side slots 104, 106, 108, 110. As used herein, the phrase "hot swappable" means and refers to an electronic system having detachable components where one of the components may be attached or detached to/from another of the components while the components are electrically powered and/or in electrical communication with each other.

Figure 4:
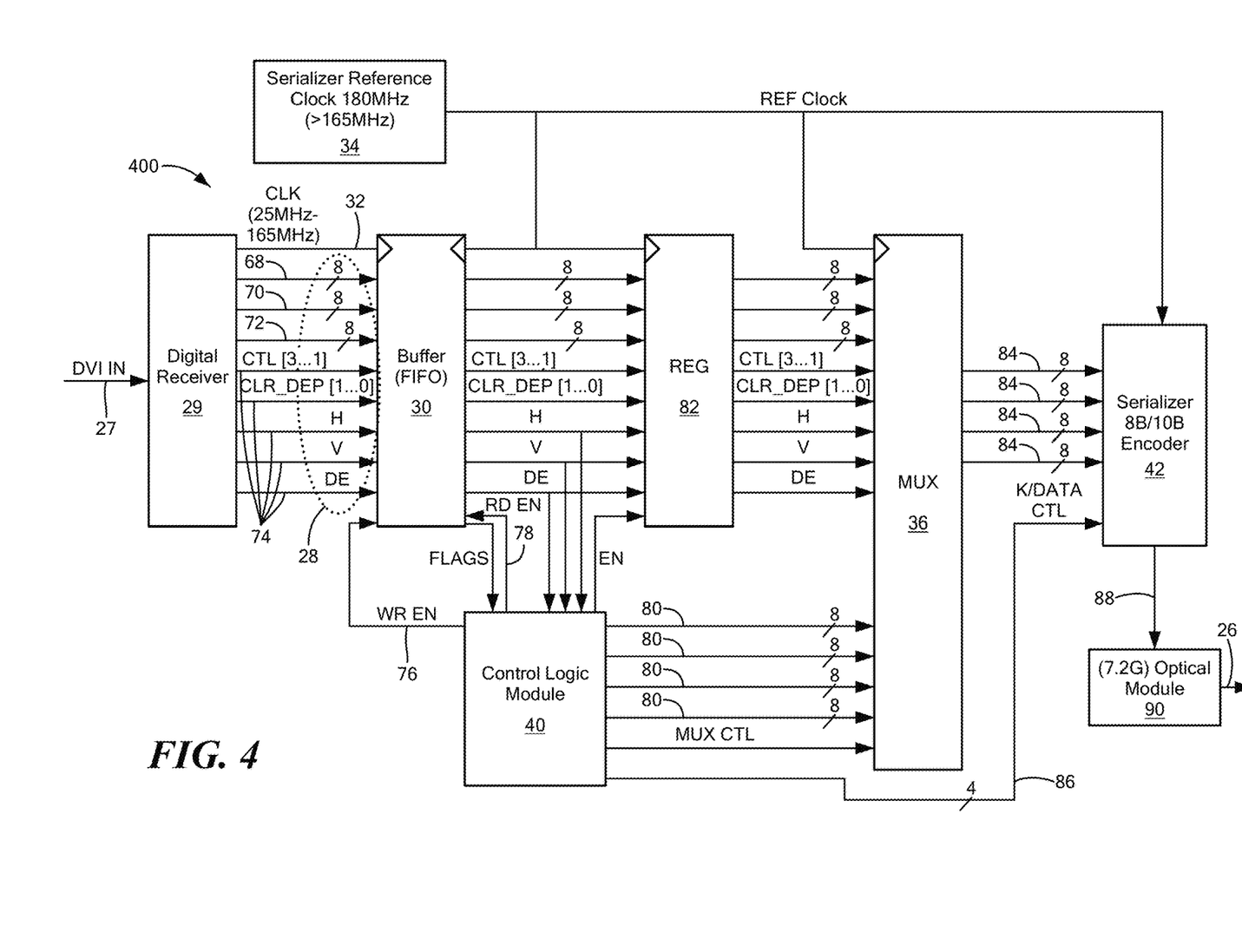
FIG. 4 depicts a block diagram of an example KVM extender transmitter of a multirate transmission system, in accordance with an embodiment.

Reference is now made to FIG. 4, which depicts a block diagram of an example KVM extender transmitter 400 of a multirate transmission system, similar to that described in U.S. Pat. No. 8,880,928, commonly assigned to Thinklogical LLC, Milford, Conn., and incorporated herein by reference in its entirety. FIG. 4 is specifically shown for an embodiment configured to receive input data from the VDI client 230, and more specifically video data 27 corresponding to the Digital Video Input (DVI) standard. This data uses Transition Minimized Differential Signaling (TDMS) and is actually a type of high speed serial data. This data is converted into parallel data 28 and clock data 32 by a digital receiver 29. As depicted in FIG. 4, the parallel data can comprise a plurality if eight bit bytes 68, 70, and 72 and associated control information designated generally as 74, including, for example, horizontal synchronization information, vertical synchronization information, and data enable (DE) information, as well as control information associated with the parallel data. The parallel input clock data 32 can, for the DVI standard, range from 25 MHz to 165 MHz. This information is clocked into buffer 30 via the clock data 32. It is read out of buffer 30 via serializer reference clock 34. Of course, any other type of data can be received at its own data clock rate. It should be noted that types of data received by the multirate transmission system can therefore be any type of data as long as the data can be converted into parallel data 28 with associated clock data 32.

As depicted, and in this particular embodiment, the serializer reference clock 34 has a data rate of 180 MHz (that is, greater than the maximum data rate of the incoming DVI data). The parallel data 28 is clocked into buffer 30 based upon the parallel data clock signal 32 in conjunction with the write enable signal 76 from control logic module 40. Buffer 30 has independent read clock capability; that is, the read clock can be different from the write clock and thus data stored in buffer 30 can be read from it by means of the serializer reference clock 34 which operates at a higher clock rate than the clock associated with the incoming parallel data. Due to the higher clock rate of the serializer reference clock 34, the buffer 30 is only read when enabled to do so by the read enable signal 78 from control logic module 40, in an arrangement that insures that there is neither underflow or overflow of the data within buffer 30. For those periods of time in which data is not being read from the buffer 30, the serializer reference clock 34 in conjunction with control module 40 generates control characters on data busses 80 so that these control characters are received by multiplexer 36. Control module 40 can generate information related to parallel data clock 32 for transmission by counting the number of parallel data clock cycles for a predetermined length of time, such as 1 millisecond. In an embodiment, the information related to the parallel data clock 32 is determined based on a ratio of the parallel input data 28 to control characters.

Serializer 42 is connected to output busses 84 from multiplexer 36 under the control of K/data control bus 86 from control logic module 40. K/data control bus 86 informs serializer 42 whether the data from multiplexer 36 corresponds to the parallel data 28 or to the control characters generated by control logic module 40 as received by multiplexer 36 via data busses 80.

In this example embodiment, serializer 42 also encodes the received parallel data, including the control characters via an encoding scheme, such as the 8B/10B encoding scheme well-known in the art. Other encoding/decoding schemes can, of course, be used, such as 64B/66B for example. In an embodiment, the serializer 42 encodes the parallel input data 28, the information related to the parallel data clock 32, and the control characters prior to serializing the parallel input data, the information related to the parallel data clock 32, and the control characters. The resulting encoded serialized output is presented on output line 88 for presentation to optical module 90 for generating a serialized output on serial data medium 26. In this particular embodiment, the optical module has a 7.2 GHz data rate so as to correspond to the maximum parallel data rate of the serializer reference clock 34 times the number of parallel data bits received by serializer 42 which, in this particular embodiment, is 40 bits. Of course, other means for transmitting a serial output data stream are possible, including the use of coaxial cable or a radio frequency output module instead of the optical module 30. Such alternative means for generating an outgoing serial data stream for long distance transmission are well-known in the art.

The buffer 30, register 82, multiplexer 36, serializer 42 and control logic module 40 of transmitter portion 400 can be fabricated from a field programmable gate array (FPGA). Optical modules 90 and 92 can be a small form factor pluggable (SFP) optical transceiver. A third SFP (see FIG. 10B for example) may be used to provide a separate fiber interface for implementing a USB2.0 device that is used to authenticate the user. This USB2.0 device may be a card reader for CAC (Common Access Card), but could also be used for any other method of authentication.

From the foregoing reference to FIG. 4, it will be appreciated that the KVM transmitter extender (transmitter for short) 400 is configured or adapted to receive input data from the VDI client 230, where the transmitter 400 includes: a buffer 30 configured or adapted to restore the parallel input data 28 based on a received parallel data clock 32 that can range from a minimum to a maximum value; a control module 40 configured or adapted to control, based on a serializer reference clock 34 having a clock frequency that is higher than the maximum clock frequency of the parallel data clock 32: reading of the parallel data from the buffer at a rate that prevents overflow and underflow of the buffer, and generating information related to the parallel data clock 32 and generating control characters on data busses 80 when data is not read from the buffer; a multiplexer 36 configured or adapted to store the information related to the parallel data clock 32 and the control characters; a serializer 42 in cooperative engagement with the multiplexer 36, configured or adapted to convert the parallel data 28, the information related to the parallel data clock 32, and the control characters into serial data on output line 88 for transmission; and a serial data transmitter 90 configured or adapted to transmit the serial data on serial data medium 26. In an embodiment, the serial data transmitter 90 is an optical transmitter. In an embodiment, the serial data transmitted from the serial data transmitter 90 is uncompressed serial data.

Figure 5:
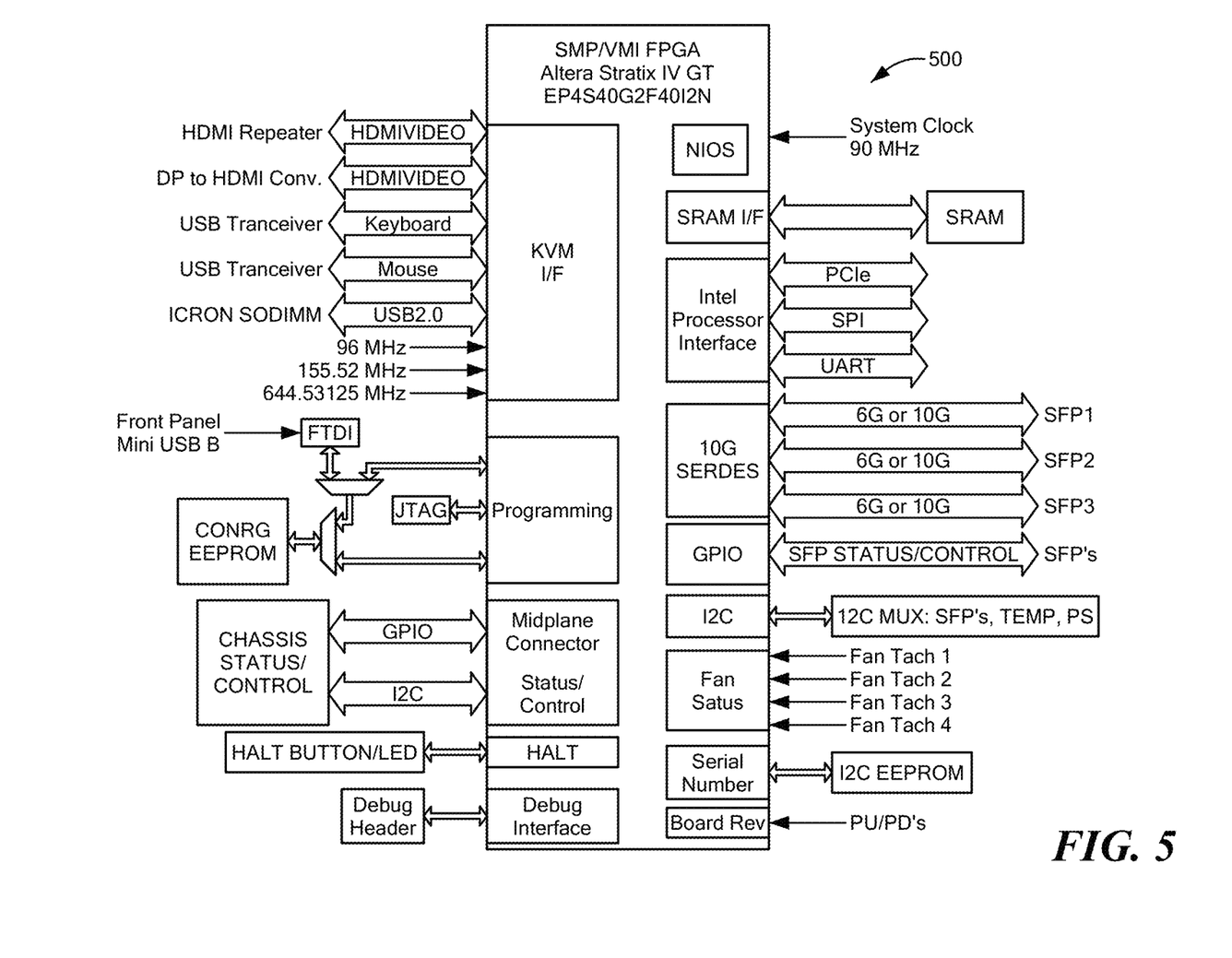
FIG. 5 depicts a block diagram of an field programmable gate array (FPGA) suitable for use as a KVM transmitter extender, in accordance with an embodiment.
Figure 6:
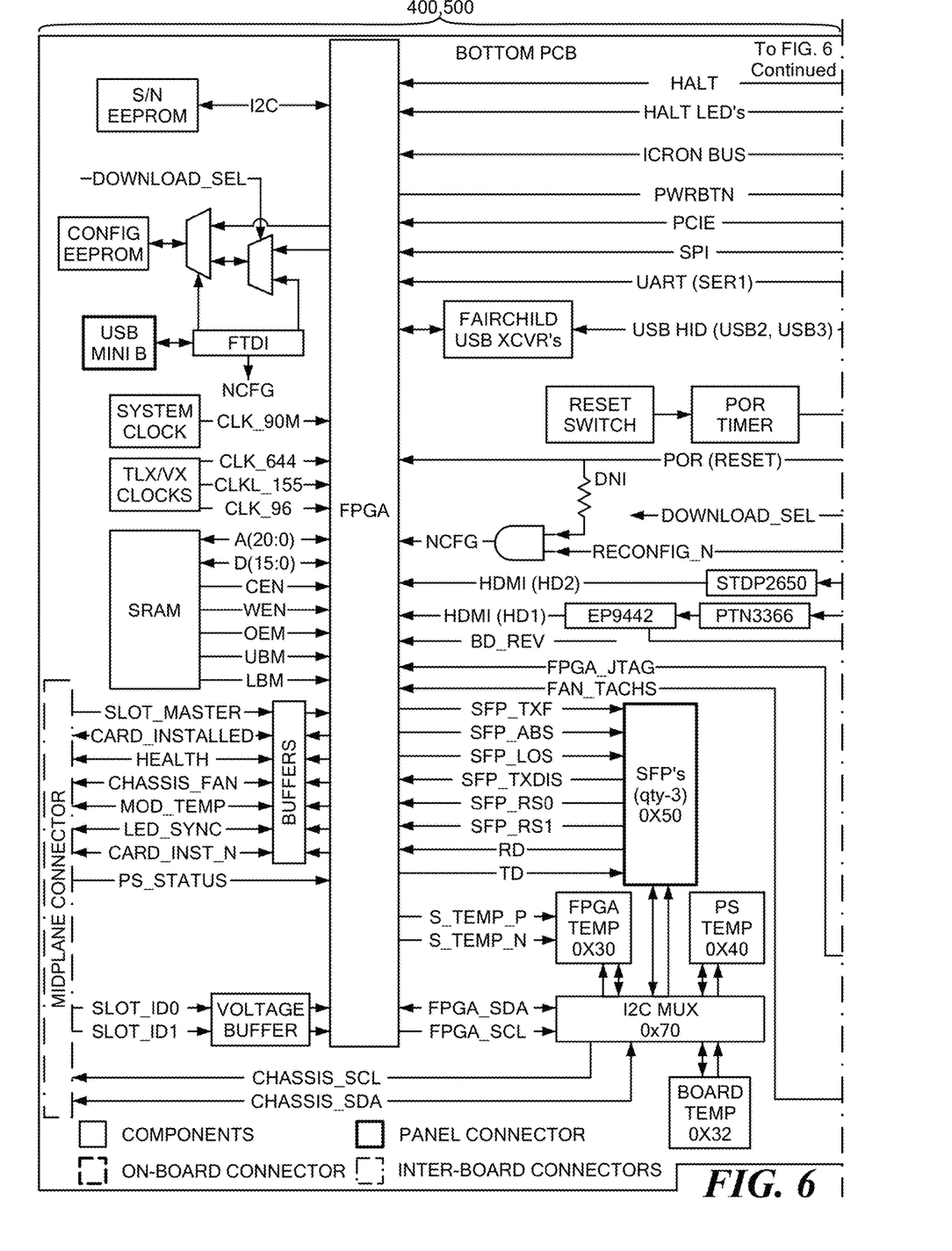
FIG. 6 depicts a further detailed block diagram of the KVM transmitter extender fabricated from the FPGA of FIG. 5 and coupled to the VDI client of FIG. 2, in accordance with an embodiment.

FIG. 5 depicts a block diagram of an FPGA (Field Programmable Gate Array) 500 suitable for use as the KVM transmitter extender 400, and FIG. 6 depicts a further detailed block diagram 600 of the KVM transmitter extender 400 fabricated from an FPGA 500 and coupled to the VDI client 230 absent discrete electrical or optical end-user cabling or connectors disposed therebetween.

Figure 7:
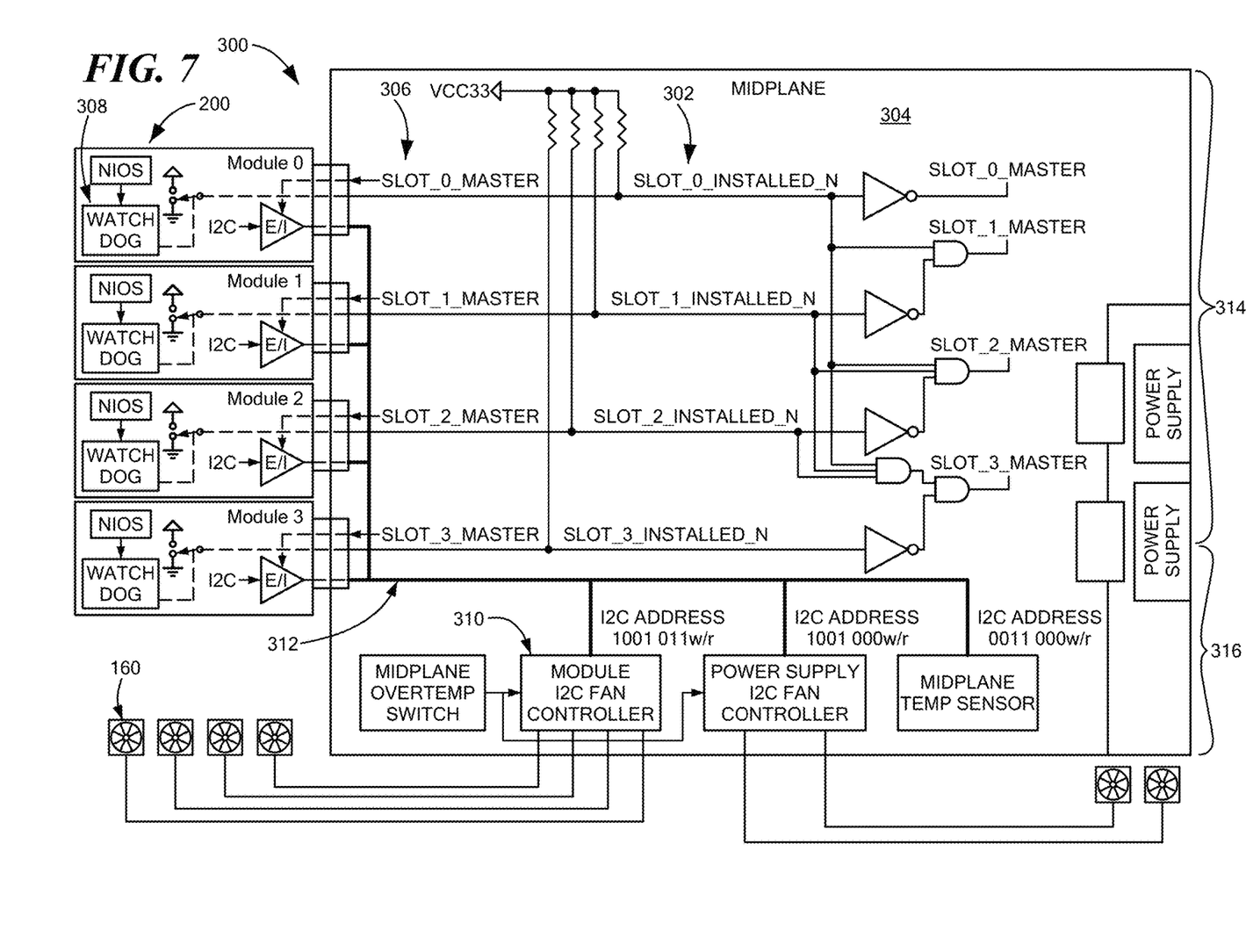
FIG. 7 depicts s temperature sensing and fan control system for use in the 1RU of FIG. 1, in accordance with an embodiment.

In view of all of the foregoing, and with reference now to FIG. 7 in combination with at least FIG. 1, where FIG. 7 depicts the aforementioned temperature sensing and fan control system 300 in more detail, which in an embodiment is referred to as a midplane I2C master for a temperature sensor/fan controller. As depicted in FIG. 7, the "SLOT_(n)_INSTALLED_N" signals 302 on the midplane PC board 304 are pulled up to a logic "high" as a default reference. When a module 200 is installed, and if the module passes a "health" check, the respective "SLOT_(n)_INSTALLED_N" signal 302 will be pulled to a logic low. The respective signal 302 will remain in the "low" state as long as the module remains "healthy". The midplane circuitry 304 will choose an I2C Master Module to be the module 200 installed farthest from the Module Chassis Fans 160 by setting the "SLOT_(n)_MASTER" signal 306 to a logic "high". If the I2C Master is removed or becomes "unhealthy", the watchdog circuitry 308 will switch the corresponding "SLOT_(n)_INSTALLED_N" signal 302 to a logic "high", allowing the next farthest module 200 in the chassis 100 to take over as the I2C Master. If no modules 200 are installed in the chassis 100, the fan controller 310 sets the fan speed default to full on. The I2C bus 312 ("Midplane_SCL, Midplane_SDA") will connect the two fan controllers and the Temperature sensor on the Midplane 304 to all modules. The module selected as "Master" will drive "Midplane SCL" 314, and send/receive data to and from the fan controllers and temperature sensor on "Midplane SDA" 316. Modules that are not "Master" will leave the corresponding signals 302 in the high impedance state.

From the foregoing description of structure, it will be appreciated that an embodiment includes a method of computing and communicating via at least one electronic module 204, the method comprising: receiving parallel input data 28 from a virtual desktop infrastructure, VDI, client 203; converting the parallel data 28 into serial data 26 for transmission via a keyboard, video and mouse, KVM, extender transmitter 400; and transmitting the serial data downstream of the at least one electronic module 204; wherein the VDI client and the KVM extender transmitter are integrally arranged to form one of the at least one electronic module 204 absent discrete electrical or optical end-user cabling disposed therebetween. In an embodiment, the at least one electronic module comprises at least four equally sized electronic modules 204, 206, 208, 210 (collectively 200) that are collectively sized to fit side-by-side within and across a horizontal width defined by a volume of space equal to 1RU. In an embodiment, the serial data transmitted downstream of the at least four equally sized modules 200 is uncompressed serial data. In an embodiment, and wherein the at least four equally sized modules 200 are disposed in a sequential side-by-side arrangement from a nearest location 204 to a farthest location 210 relative to the at least one fan 160, the method further includes: sensing a temperature and controlling the at least one fan 160 via a temperature sensing and fan control system 300 configured or adapted to: select an operational one of the at least four equally sized modules 200 that is at the farthest location (210 for example) as a master module, and in response to the master module becoming non-operational, automatically select another operational one of the at least four equally sized modules 200 that is at the next farthest location (208 for example) as a replacement master module; wherein the module selected as the master module, or as the replacement master module if the master module is non-operational, is the controlling module that controls send and receive data to and from the temperature sensing and fan control system for controlling operation of the at least one fan 160 based at least in part on a sensed temperature associated with the controlling module. In an embodiment, each of the at least four equally sized modules 200 are hot swappable in and out of a corresponding slot 104, 106, 108, 110 of the 1RU, the method further comprising: in response to the controlling module becoming non-operational during a hot swappable event, automatically selecting another operational one of the at least four equally sized modules that is at the next farthest location (206 for example) as the replacement master and controlling module.

Figure 8:
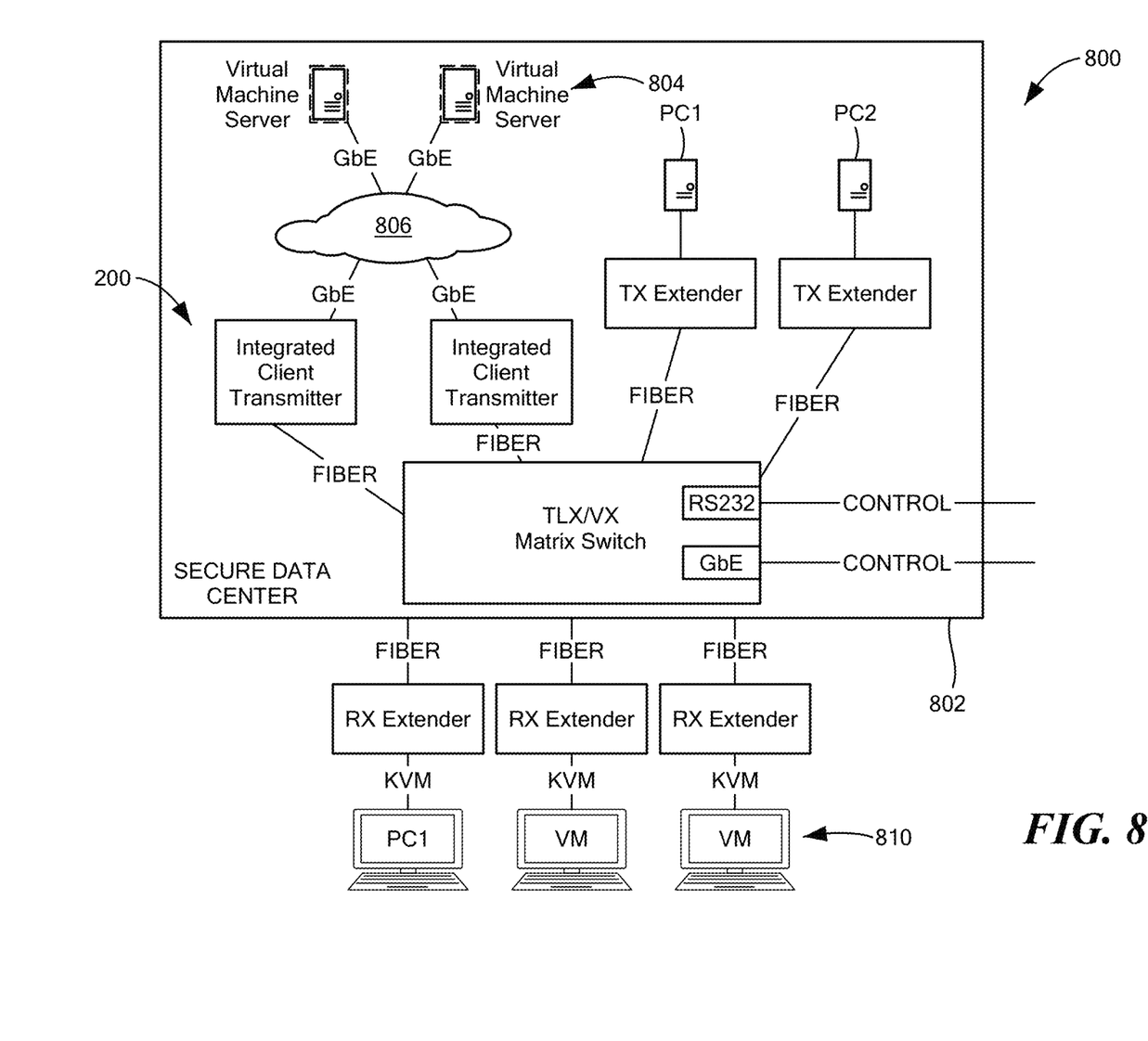
FIG. 8 depicts a system block diagram where one or more modules of FIG. 2, each module having integrated ones of the VDI client and KVM transmitter extender of FIG. 2, disposed inside a secure data center, in accordance with an embodiment.

Reference is now made to FIG. 8, which depicts a system block diagram 800 where one or more modules 200, 204, 206, 208, 210, for example, having the aforementioned integrated VDI client 230 and KVM transmitter extender 400, are disposed inside a secure data center 802, thereby eliminating the system security vulnerability of existing virtual desktop technologies by enabling the VDI client 230 to be physically secured in the data center 802 along with the KVM transmitter extender 400 along with at least one central server 804, removing the connected network 806 from an end-user's desk 810. In an embodiment, the VDI client 230 is configured or adapted to execute virtualization software that resides on the computer server 804 in the data center 802.

Figure 9A:
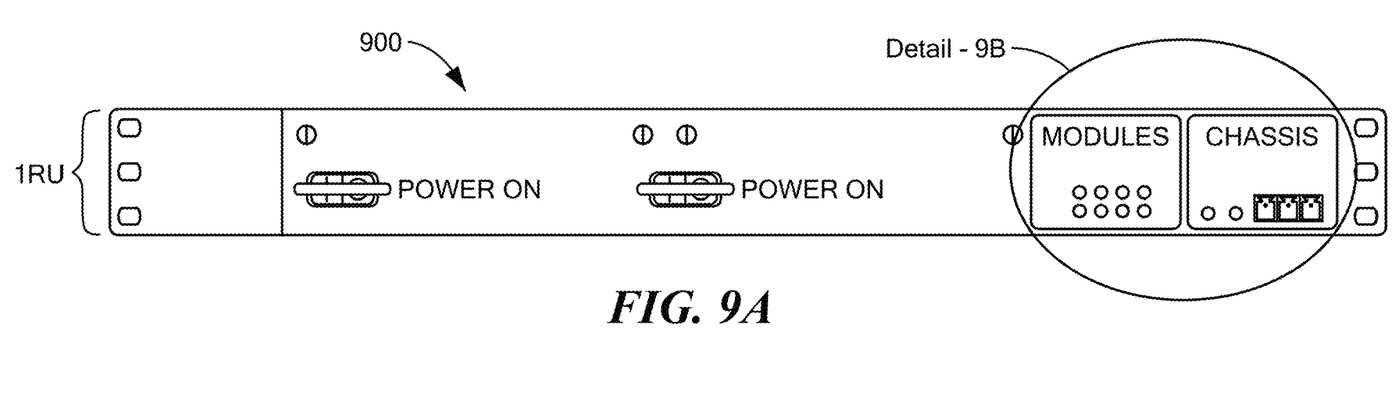
FIG. 9A depicts a panel front view of the 1RU chassis of FIG. 1 containing four equally sized modules of FIG. 3, in accordance with an embodiment.
Figure 9B:
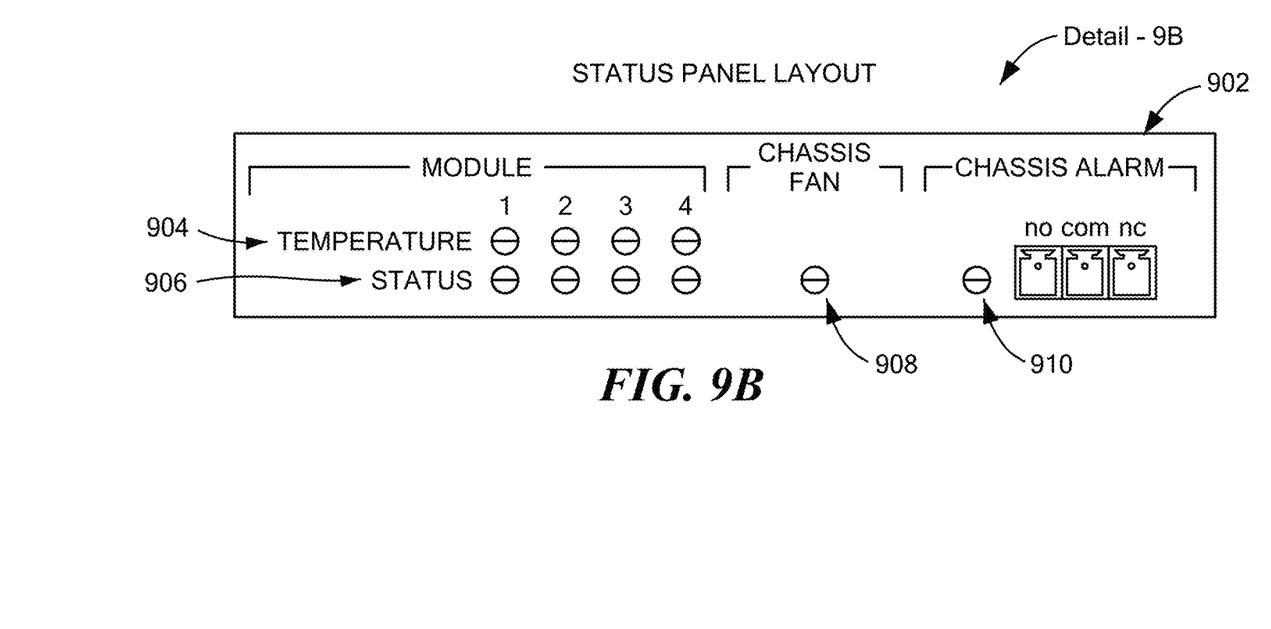
FIG. 9B depicts Detail-9B of FIG. 9A, in accordance with an embodiment.
Figure 10A:
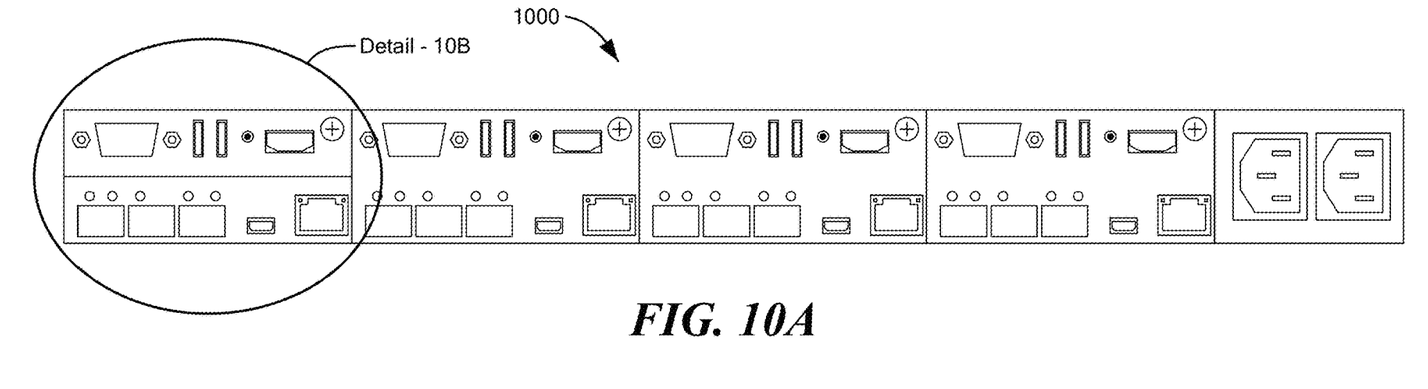
FIG. 10A depicts a panel rear view of the 1RU chassis of FIG. 1 containing four equally sized modules of FIG. 3, in accordance with an embodiment.

Reference is now made to FIGS. 9A, 9B, 10A and 10B, where FIG. 9A depicts a panel front view 900 and FIG. 10A depicts a panel rear view 1000, of a 1RU chassis 100 containing four equally sized modules 200 as herein disclosed.

FIG. 9B depicts Detail-9B 902 of FIG. 9A, where in an embodiment the 1RU Chassis 100 has bi-color red/blue LED indicators for the following: (1) Individual module temperature status (4 total) 904; (2) Individual module status (health) (4) 906; (3) Common chassis fan status (1) 908; and, (4) Common chassis alarm status (1) 910. The Module Temperature indicator 904 is driven by the corresponding installed module 200, and is blue to indicate nominal operation, and red to indicate that the module is in an overtemperature state. The Module Status indicator 906 is also driven by the corresponding installed module 200, and is blue to indicate nominal operation, and red to indicate a status alert. The Chassis Fan indicator 908 is driven by the I2C Master Module (one of 204, 206, 208, 210, as described herein above). It will be blue to indicate all chassis fans 160 are operating nominally, and red if one or more fans 160 are slow or stopped. The Chassis Alarm indicator 910 is the logical or-ing of the temperature, status, and chassis fan signals. It will be blue to indicate that there are no temperature, status, or fan concerns for the chassis, and red if one or more of these conditions exist. The LED indicators for Temperature and Status for a slot in which there is no module installed will be off. If there are no modules installed, all indicators for Temperature and Status will be off. The Chassis Fan indicator 908 will be on if there is at least one module installed. If no modules are installed, the indicator will be off. The Chassis Alarm indicator 910 will be on if there is at least one module installed. If no modules are installed, the indicator will be off.

Figure 10B:
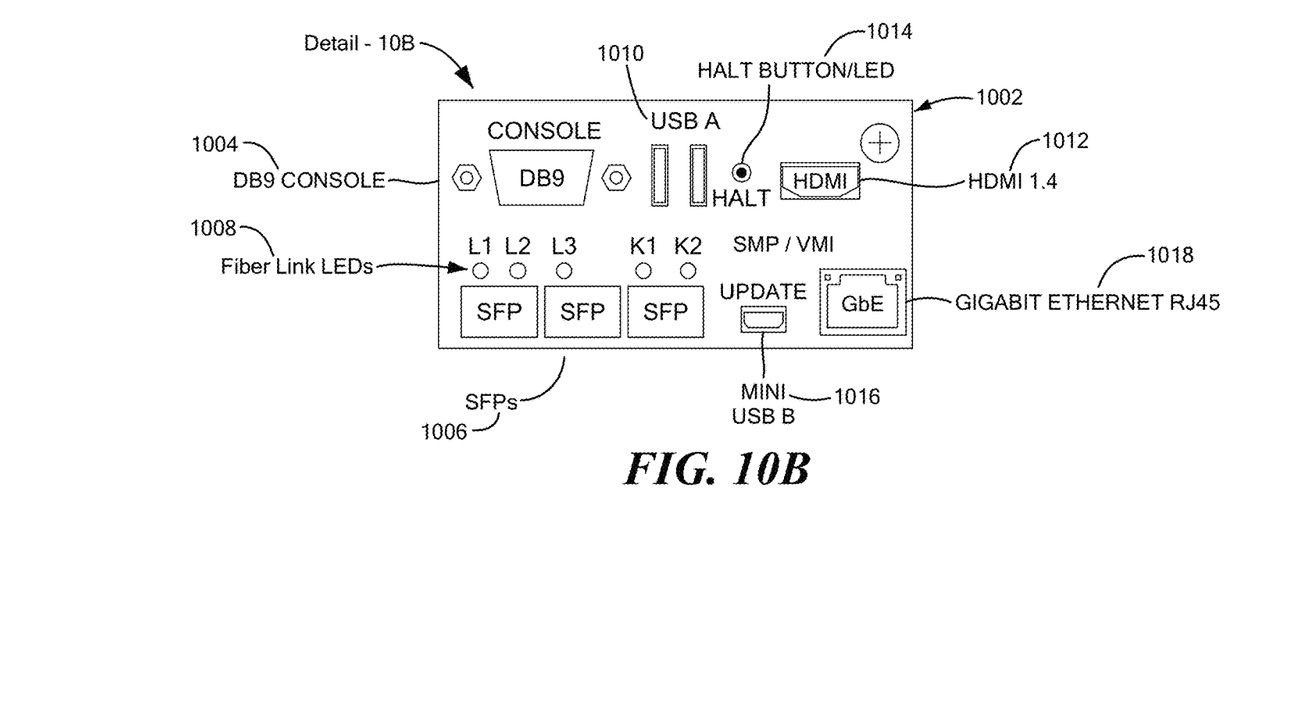
FIG. 10B depicts Detail-10B of FIG. 9B, in accordance with an embodiment.

FIG. 10B depicts Detail-10B 1002 of FIG. 10A. As depicted, an embodiment of the rear panel 1000 of each module 200 includes: a console connection port 1004; a plurality of SFPs (small form factor pluggable, fiber optic or copper) ports 1006 with LED status indicators 1008; multipurpose USB ports 1010 (local access, control, status, etc.); video (HDMI) output port 1012; a halt button and LED indicator 1014; a multi-purpose mini USB port 1016 (firmware updates, ICT control and status via terminal emulator, or other function); and, an Ethernet port 1018. While Detail-10B 1002 depicts a certain combination and arrangement of ports, connectors, and indicators, it will be appreciated that this is for illustration purposes only, and that other embodiments may include other functional features as may be determined and requested by an end user.

An embodiment may be embodied in the form of computer-implemented processes and apparatuses for practicing those processes. In an embodiment, an apparatus for practicing those processes may be a control module, which may be a processor-implemented module or a module implemented by a computer processor, and may include a microprocessor, an ASIC, or software on a microprocessor. The present invention may also be embodied in the form of a computer program product having computer program code containing instructions embodied in tangible media, such as floppy diskettes, CD-ROMs, hard drives, USB (universal serial bus) drives, or any other computer readable storage medium, such as random access memory (RAM), read only memory (ROM), erasable programmable read only memory (EPROM), electrically erasable programmable read only memory (EEPROM), or flash memory, for example, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to enable operation of a computing and communication module that eliminates the system security vulnerability of existing virtual desktop technologies by enabling the VDI client to be physically secured in the data center along with the KVM extender and the central server, removing the network from an end-user's desk.

While an invention has been described herein with reference to example embodiments, it will be understood by those skilled in the art that various changes may be made and equivalents may be substituted for elements thereof without departing from the scope of the claims. Many modifications may be made to adapt a particular situation or material to the teachings of the invention without departing from the essential scope thereof. Therefore, it is intended that the invention not be limited to the particular embodiment or embodiments disclosed herein as the best or only mode contemplated for carrying out this invention, but that the invention will include all embodiments falling within the scope of the appended claims. In the drawings and the description, there have been disclosed example embodiments and, although specific terms and/or dimensions may have been employed, they are unless otherwise stated used in a generic, exemplary and/or descriptive sense only and not for purposes of limitation, the scope of the claims therefore not being so limited. When an element or feature is referred to as being "on" another element, it can be directly on the other element, or intervening elements may also be present. In contrast, when an element is referred to as being "directly on" another element, there are no intervening elements present. The use of the terms first, second, etc. do not denote any order or importance, but rather the terms first, second, etc. are used to distinguish one element from another. The use of the terms a, an, etc. do not denote a limitation of quantity, but rather denote the presence of at least one of the referenced item. The term "comprising" as used herein does not exclude the possible inclusion of one or more additional features. And, any background information provided herein is provided to reveal information believed by the applicant to be of possible relevance to the invention disclosed herein. No admission is necessarily intended, nor should be construed, that any of such background information constitutes prior art against an embodiment of the invention disclosed herein.

The invention claimed is:

1. A computing and communication module, comprising:
a processing circuit configured or adapted to function as a virtual desktop infrastructure, VDI, client; and
a keyboard, video and mouse, KVM, extender transmitter disposed in signal communication with the processing circuit;
wherein four equally sized ones of the module are collectively sized to fit within a volume of space defined by 1 racking unit, 1RU;
wherein the KVM extender transmitter is configured or adapted to receive parallel input data from the VDI client, the transmitter comprising:
a buffer configured or adapted to restore the parallel input data based on a received parallel data clock having a clock frequency that can range from a minimum to a maximum value;
a control module configured or adapted to control, based on a serializer reference clock having a clock frequency that is higher than the maximum clock frequency of the parallel data clock:
reading of the parallel data from the buffer at a rate that prevents overflow and underflow of the buffer, and
generating information related to the parallel data clock and generating control characters when data is not read from the buffer;
a multiplexer configured or adapted to store the information related to the parallel data clock and the control characters;
a serializer in cooperative engagement with the multiplexer, configured or adapted to convert the parallel data, the information related to the parallel data clock, and the control characters into serial data for transmission; and
a serial data transmitter configured or adapted to transmit the serial data.

2. The module of claim 1, wherein:
the serializer is configured or adapted to encode in an encoding scheme the parallel input data, the information related to the parallel data clock, and the control characters prior to serializing the parallel input data, the information related to the parallel data clock, and the control characters.

3. The module of claim 2, wherein:
the encoding scheme is 8B/10B.

4. The module of claim 2, wherein:
the encoding scheme is 64B/66B.

5. The module of claim 1, wherein:
the information related to the parallel data clock is determined based on a ratio of the parallel input data to control characters.

6. The module of claim 1, wherein:
the serial data transmitter is an optical transmitter.

7. The module of claim 1, wherein:
the VDI client is configured or adapted to execute virtualization software that resides on a computer server in a data center.

8. The module of claim 1, wherein:
the serial data transmitted from the serial data transmitter is uncompressed serial data.

9. The module of claim 1, wherein:
wherein the VDI client and the KVM extender transmitter are integrally arranged within the module absent discrete electrical or optical end-user cabling disposed therebetween.

10. The module of claim 1, wherein:
the VDI client and the KVM extender transmitter are integrally arranged within the module absent discrete electrical or optical end-user plug-in connectors disposed therebetween.

11. A chassis compartment, comprising:
a plurality of side-by-side ones of a computing and communication module;
each one of the plurality of the computing and communication module comprising:
 a processing circuit configured or adapted to function as a virtual desktop infrastructure, VDI, client; and
 a keyboard, video and mouse, KVM, extender transmitter disposed in signal communication with the processing circuit;
 wherein four equally sized ones of the module are collectively sized to fit within a volume of space defined by 1 racking unit, 1RU;
the chassis compartment further comprising:
at least one power supply configured or adapted to provide electrical power to the plurality of modules;
at least one first fan configured or adapted to deliver air movement toward the at least one power supply;
at least on second fan configured or adapted to deliver air movement toward the plurality of modules;
the plurality of modules being disposed in a sequential side-by-side arrangement from a nearest location to a farthest location relative to the at least one second fan;
a temperature sensing and fan control system configured or adapted to:
 select an operational one of the plurality of modules that is at the farthest location as a master module, and in response to the master module becoming non-operational, automatically select another operational one of the plurality of modules that is at the next farthest location as a replacement master module;
wherein the module selected as the master module, or as the replacement master module if the master module is non-operational, is the controlling module that controls send and receive data to and from the temperature sensing and fan control system for controlling operation of the at least one second fan based at least in part on a sensed temperature associated with the controlling module.

12. The chassis compartment of claim 11, wherein:
the at least one power supply comprises two power supplies;
the at least one first fan comprises two fans; and
the at least one second fan comprises four fans.

13. The chassis compartment of claim 11, wherein:
the chassis compartment is sized to fit within a volume of space defined by 1 racking unit, 1RU.

14. The chassis compartment of claim 13, wherein:
the volume of space defined by 1RU is further defined by a height H equal to 1.75 inches, a width W equal to 19 inches, and a depth D equal to 19 inches.

15. The chassis compartment of claim 11, wherein:
each one of the plurality of modules are equally sized.

16. The chassis compartment of claim 11, wherein:
each one of the plurality of modules is hot-swappable in and out of the chassis compartment.

17. A method of computing and communicating via at least one electronic module that is a computing and communication module comprising: a processing circuit configured or adapted to function as a virtual desktop infrastructure, VDI, client; and a keyboard, video and mouse, KVM, extender transmitter disposed in signal communication with the processing circuit; wherein four equally sized ones of the module are collectively sized to fit within a volume of space defined by 1 racking unit, 1RU, the method comprising:
receiving parallel input data from a virtual desktop infrastructure, VDI, client;
converting the parallel data into serial data for transmission via a keyboard, video and mouse, KVM, extender transmitter; and
transmitting the serial data downstream of the at least one electronic module;
wherein the VDI client and the KVM extender transmitter are integrally arranged to form one of the at least one electronic module absent discrete electrical or optical end-user cabling disposed therebetween;
wherein the VDI client and the KVM extender transmitter are integrally arranged to form the one of the at least one electronic module absent discrete electrical or optical end-user plug-in connectors disposed therebetween;
wherein the at least one electronic module comprises at least four of the electronic modules that are equally sized and are collectively sized to fit within a volume of space defined by 1 racking unit, 1RU;
wherein the serial data transmitted downstream of the at least four equally sized modules is uncompressed serial data;
wherein the at least four equally sized modules are disposed in a sequential side-by-side arrangement from a nearest location to a farthest location relative to at least one fan, the method further comprising:
 sensing a temperature and controlling the at least one fan via a temperature sensing and fan control system configured or adapted to:
 select an operational one of the at least four equally sized modules that is at the farthest location as a master module, and in response to the master module becoming non-operational, automatically select another operational one of the at least four equally sized modules that is at the next farthest location as a replacement master module;
 wherein the module selected as the master module, or as the replacement master module if the master module is non-operational, is the controlling module that controls send and receive data to and from the temperature sensing and fan control system for controlling operation of the at least one fan based at least in part on a sensed temperature associated with the controlling module.

18. The method of claim 17, wherein:
the volume of space defined by 1RU is further defined by a height H equal to 1.75 inches, a width W equal to 19 inches, and a depth D equal to 19 inches.

19. The method of claim 17, wherein:
the at least four equally sized modules are sized to fit side-by-side within and across a horizontal width of the 1RU.

20. The method of claim 17, wherein each of the at least four equally sized modules are hot swappable in and out of the 1RU, the method further comprising:

in response to the controlling module becoming non-operational during a hot swappable event, automatically selecting another operational one of the at least four equally sized modules that is at the next farthest location as the replacement master and controlling module.

* * * * *